US007983241B2

(12) United States Patent
Furuskar et al.

(10) Patent No.: US 7,983,241 B2
(45) Date of Patent: Jul. 19, 2011

(54) METHOD, SYSTEM, TERMINAL AND COMPUTER PROGRAM PRODUCT FOR SELECTING RADIO ACCESS SYSTEM IN A MULTIACCESS SYSTEM

(75) Inventors: Anders Furuskar, Stockholm (SE); Arne Simonsson, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 788 days.

(21) Appl. No.: 10/579,844

(22) PCT Filed: Dec. 17, 2003

(86) PCT No.: PCT/SE03/01965
§ 371 (c)(1), (2), (4) Date: Jan. 10, 2007

(87) PCT Pub. No.: WO2005/060302
PCT Pub. Date: Jun. 30, 2005

(65) Prior Publication Data
US 2007/0171868 A1 Jul. 26, 2007

(51) Int. Cl.
*H04L 12/66* (2006.01)
(52) U.S. Cl. ........ 370/352; 370/353; 370/354; 370/355; 370/356; 370/357; 455/453; 455/445
(58) Field of Classification Search .................. 455/403, 455/452.2, 435.2, 445, 422.1; 370/328–330, 370/352, 392, 396, 395.1, 395.2, 395.4, 395.21, 370/395.5, 349, 384
See application file for complete search history.

(56) References Cited

U.S. PATENT DOCUMENTS

| | | | |
|---|---|---|---|
| 5,517,500 A * | 5/1996 | White et al. .................. 370/392 |
| 6,122,263 A * | 9/2000 | Dahlin et al. ................. 370/329 |
| 6,359,877 B1 * | 3/2002 | Rathonyi et al. ............. 370/349 |
| 6,650,640 B1 * | 11/2003 | Muller et al. ................. 370/392 |
| 6,882,843 B1 * | 4/2005 | Comer .......................... 455/445 |
| 6,934,258 B1 * | 8/2005 | Smith et al. .................. 370/238 |
| 7,324,554 B1 * | 1/2008 | Ginjpalli et al. ............. 370/468 |
| 7,664,465 B2 * | 2/2010 | Shen et al. ................... 455/63.1 |
| 7,756,082 B1 * | 7/2010 | Dhamdhere .................. 370/331 |
| 7,787,434 B2 * | 8/2010 | Nandagopalan ............. 370/345 |
| 2002/0080774 A1* | 6/2002 | Griffith et al. ............... 370/352 |
| 2002/0191559 A1* | 12/2002 | Chen et al. ................... 370/329 |

(Continued)

FOREIGN PATENT DOCUMENTS
WO 01/35578 A1 5/2001
WO 0135578 A1 5/2001
WO 03/088686 A1 10/2003

OTHER PUBLICATIONS

International Preliminary Report on Patentability mailed Apr. 5, 2006 in corresponding PCT Application No. PCT/SE2003/001965.

(Continued)

*Primary Examiner* — Kamran Afshar
*Assistant Examiner* — Babar Sarwar
(74) *Attorney, Agent, or Firm* — Nixon & Vanderhye P.C.

(57) ABSTRACT

A method for selecting radio access system in a multi access system handling packet data services where a terminal can communicate with at least two different types of access systems. According to the invention the method comprises the steps of:—determining (S23) packet characteristics of each packet to be transmitted;—selecting (S31) one of the available accesses for the transmission of each packet, the selection being based on the determined packet characteristic for this specific packet; and—transmitting (S37) the packet through the selected access.

24 Claims, 4 Drawing Sheets

U.S. PATENT DOCUMENTS

| | | | |
|---|---|---|---|
| 2003/0026211 A1 | 2/2003 | Xu et al. | |
| 2003/0043773 A1* | 3/2003 | Chang | 370/338 |
| 2003/0099207 A1* | 5/2003 | Yamato | 370/280 |
| 2004/0242235 A1* | 12/2004 | Witana | 455/452.2 |
| 2005/0090262 A1* | 4/2005 | Hamano et al. | 455/445 |
| 2005/0111437 A1* | 5/2005 | Maturi | 370/352 |

OTHER PUBLICATIONS

International Search Report of PCT/SE2003/001965, mailed Sep. 21, 2004.

3GPP Future Evolution Workshop, Nortel Networks, "Stand-Alone Data-Cells for UMTS", Oct. 18-19, 2001, 12 pages.

Apostolis K. Salkintzis et al., IP Multimedia in Next-Generation Mobile Networks: Services, Protocols, and Technologies, "WLAN-GPRS Integration for Next-Generation Mobile Data Networks", Oct. 2002, 13 pages.

Matthew Sherman et al., "On the Need for Efficiency in the 802.11 QoS Solution", Jan. 2001, 26 pages.

* cited by examiner

METHOD, SYSTEM, TERMINAL AND COMPUTER PROGRAM PRODUCT FOR SELECTING RADIO ACCESS SYSTEM IN A MULTIACCESS SYSTEM

This application is the US national phase of international application PCT/SE2003/001965, filed 17 Dec. 2003, which designated the U.S., the entire content of which is hereby incorporated by reference.

TECHNICAL FIELD

The present disclosure relates to a method, a system, a terminal and a computer program product for selecting radio access system in a multi access system handling packet data services where a terminal can communicate with at least two different types of access systems.

BACKGROUND

Several multi-access scenarios will exist in the near future, for example UMTS (Universal Mobile Telecommunication System)/GSM (Global System for Mobile communication) and UMTS/WLAN (Wireless Local Area Network). In many cases, the same end-user service can be carried by more than one of the included accesses. For example, best effort packet data can be carried by both UMTS and WLAN. A selection of which access to use must thus be done.

In the prior art, it has been observed that the accesses are, on a by call or session basis, not equally efficient for different types of end user services. Consequently, to increase the common multi-access capacity, it has been proposed to allocate calls or sessions of a service to the access by which the service is most efficiently handled. This is described in patent application nr: PCT/SE03/00611.

In Alcatel, "Simultaneous Access", S2-030215, 3GPP TSG-SA WG meeting #29, 3GPP, it is discussed to enable simultaneous packet switched associations over WLAN and cellular (GPRS (General Packet Radio Service)). That is to establish and maintain two connection paths enabling packet transmission through both accesses without prior signaling.

There are two widely discussed ways to combine the existing cellular and WLAN structures, tight interworking and loose interworking. This is described in "WLAN-GPRS Integration for Next-Generation Mobile Data Networks" by Apostolis et al. IEEE Wireless Csommunication, October 2002.

In "Stand-Alone Data-Cells for UMTS", Tdoc FEW-0032/01, 3GPP Future Evolution Workshop, October 2001 Helsinki, Source: Nortel Networks, an additional suggestion, WLAN integrated in UTRAN, is described.

In the above scenarios, there is a possibility to maintain associations through both cellular and WLAN radio access, as discussed in "Simultaneous Access". The protocol level where the association shall be maintained will be dependent on the splitting point on the network side, i.e. the "last" common node for the different systems. Examples are:

For WLAN integrated in UTRAN (UMTS Terrestrial Radio Access Network) the splitting point for WLAN/UMTS is in the RNC (Radio Network Controller). Two associations are then maintained on RNC-level.

For tight interworking the splitting point is in SGSN (Serving GPRS Support Node). Two associations are then maintained on IP-level. That means two IP-addresses and multihoming, see "Simultaneous Access".

For loose interworking the splitting point is in an IP-router. Two associations are then maintained on IP-level as for tight interwork.

For all scenarios there is also a splitting point in the user terminals, i.e. the terminals need to be able to communicate through the different access systems and the terminal has to choose, or be instructed to choose, one of the systems.

End user services are partly characterized by a set of traffic characteristics, including packet size statistics. In "On the Need for Efficiency in the 802.11 QoS Solution" by M. Sherman, IEEE 802.11-01/045, January 2001, it is disclosed that the spectrum efficiency of the WLAN (IEEE 802.11) depends on the packet size. Small packets are inefficiently handled, especially for the higher order modulation schemes.

SUMMARY

An object of one or more embodiments of the present invention is to provide an effective multi access system.

The selection of access is according to a non-limiting aspect of the invention based on packet characteristics and a new selection of access is made for each packet to be transmitted. Hereby the best access is selected for each packet and the efficiency of the system is increased.

Suitably the load in the different access systems is considered together with the packet characteristics when selecting one of the access systems.

In one preferred embodiment the determined packet characteristics is packet size and suitably the determined packet size is compared with at least one packet size threshold which is defined in the multi access system as a border value of the packet size where a larger packet size suitably is transferred in one access system and a smaller packet size suitably is transferred in another access system for achieving the best transferring efficiency.

Further suitable embodiments are described in the dependent claims.

DETAILED DESCRIPTION

According to a non-limiting aspect of the invention several (at least two) radio accesses are available and interfaced by user terminals in the system. In a multi-access network for packet data the selection of radio access shall be based on individual packet level, rather than on service level (which roughly corresponds to expected packet statistics). Each service/connection is associated to and utilizes several accesses and each packet is sent on the most efficient access. One packet characteristic that can be used as selection criteria is the packet-size. Another selection criterion is the packet inter-arrival-time, i.e. the time between subsequent packets in a data flow, since delay in cellular systems is dependent on the packet inter-arrival-time because of set up times.

Examples of other packet individual characteristics that has different performance on different accesses and that could differ between packets within the same flow are PER(Packet Error Rate)-requirements, BER(Bit Error Rate)-requirements and delay requirements. Packets with different delay and error rate requirements often appear in multimedia flows, e.g. during a net meeting session with mixed voice, video and slide show data. Different access technologies may perform differently well for different packet or bit error rate requirements. For example, due to updating the transmission power 1500 times per second, WCDMA efficiently supports very low bit and packet error rates. In GSM on the other hand, the power is updated only 2 times per second, and low packet or bit error rates less efficiently supported.

The same is true for different delay requirements. For example, GSM/EDGE offers high capacity provided that a relatively large number of retransmission of every packet is allowed. If, in order to reduce delay, no retransmissions are allowed the capacity decreases significantly. For WLANs the time between retransmission is much smaller, and the capacity less consequently dependent on the delay requirement (for delay requirements in the range of GSM/EDGE).

In the examples above, a capacity gain can thus be achieved by allocating the packets in the access technology that most efficiently handles the packet characteristics (delay and/or error rate requirement) in question.

All these described packet-characteristics can be used as selection criteria of access, individual and in combinations, as will be illustrated with the following non-limiting embodiments.

When multiple associations are maintained, for example by establishing connection paths through more than one access as described in the reference "Simultaneous Access" mentioned above, it will be possible to select on which access each packet shall be sent. The choice is then based on packet-characteristic. The packet characteristic can be extracted from the (IP-)header of the packet or by measuring the packet(s) in the queue.

Figure 1:
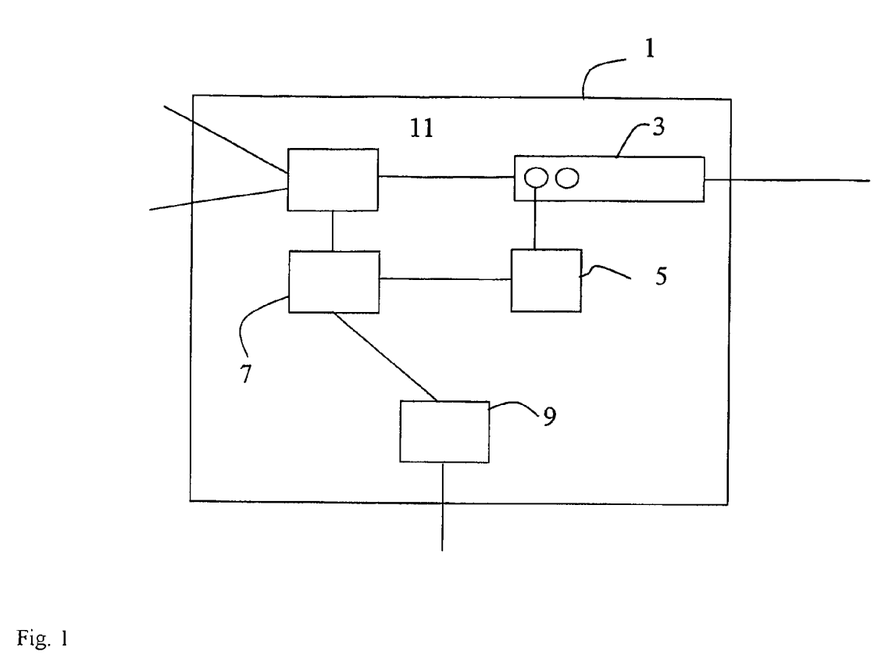
FIG. 1 is a schematic view of non-limiting inventive parts in a splitting point in a multi access system.

The splitting points in the multi access system include comprise some functions that are specific for the invention. In FIG. 1 these functions are shown schematically as means performing the method steps. As defined above the splitting points are nodes in the network, such as for example RNC or SGSN and they are also user terminals. The splitting points are nodes where a selection of access needs to be done. They are switching points and direct data to the different accesses. Even if FIG. 1 shows all functions as comprised in the splitting point this is not necessary. The functions could be performed some other place in the network and the result telling which access to select could just be retrieved by the splitting point.

In FIG. 1 a splitting point 1 is shown comprising a packet queue 3. Data to be transmitted out from the splitting point is queued here and the packets are separated and transmitted one by one. The splitting point 1 comprises further a packet characteristic determining means 5 that is connected to the packet queue 3. The packet characteristic determining means 5 is adapted to determine a packet characteristic for the first packet in the queue. The packet characteristic is in one embodiment of the invention the packet size. The packet size could be extracted from the header of the packet or it could be determined by measuring how big part of the memory the packet occupies. Other characteristics that could be used as selection criteria are as described above the packet inter-arrival-time, PER-, BER- and delay requirements. PER-, BER- and delay requirements can be extracted from the header. Packet inter-arrival-time can be measured at the packet arrival to the queue.

The splitting point 1 further comprises an access selecting means 7 connected to the packet characteristic determining means 5. The access selecting means 7 is adapted to select one of the available accesses depending on the determined packet characteristic that is retrieved from the packet characteristic determining means 5. If for example the packet characteristic is packet size the access selecting means could comprise predefined threshold values for the packet size. Alternatively threshold values could be sent to the splitting point from some other node in the system. The determined packet size is compared with the threshold(s). One access is selected if the packet size is larger than a threshold and another access if it is smaller. If instead packet inter-arrival-time, PER- BER- or delay requirements is used as the packet characteristic other predefined threshold values should be provided in the access selecting means 7. The access selecting means 7 is suitably connected to a load measuring means 9. The load measuring means 9 measures or retrieves a measure from some other place in the system of the load in the different access systems. These load measurements are forwarded to the access selecting means 7 and should be used together with the packet characteristic when the access is selected. For example if the access selecting means comprises threshold values these values can be adjusted depending on the load in the different accesses. If one access is overloaded at the moment then another access should maybe be selected even if according to the packet characteristic this is less efficient. In one embodiment of the invention the load measurements are performed centrally in the system and furthermore the thresholds are set and adjusted centrally. Information of adjusted thresholds is then continually distributed to the splitting points.

The access selecting means 7 is further connected to a switching means 11 which is connected to the packet queue 3 and to the different access systems. The access selecting means 7 is adapted to forward instructions to the switching means 11 about which access that should be selected for each packet. The packets are forwarded one by one through the switching means 11 and they are directed to the selected accesses. The switching means 11 is thus controlled by the access selecting means 7.

There could be more than two access systems. In this case the access selecting means 7 comprises suitably more than one threshold. It is further possible that the access selection can be based on more than one packet characteristic. See for example the third embodiment.

Figure 2:
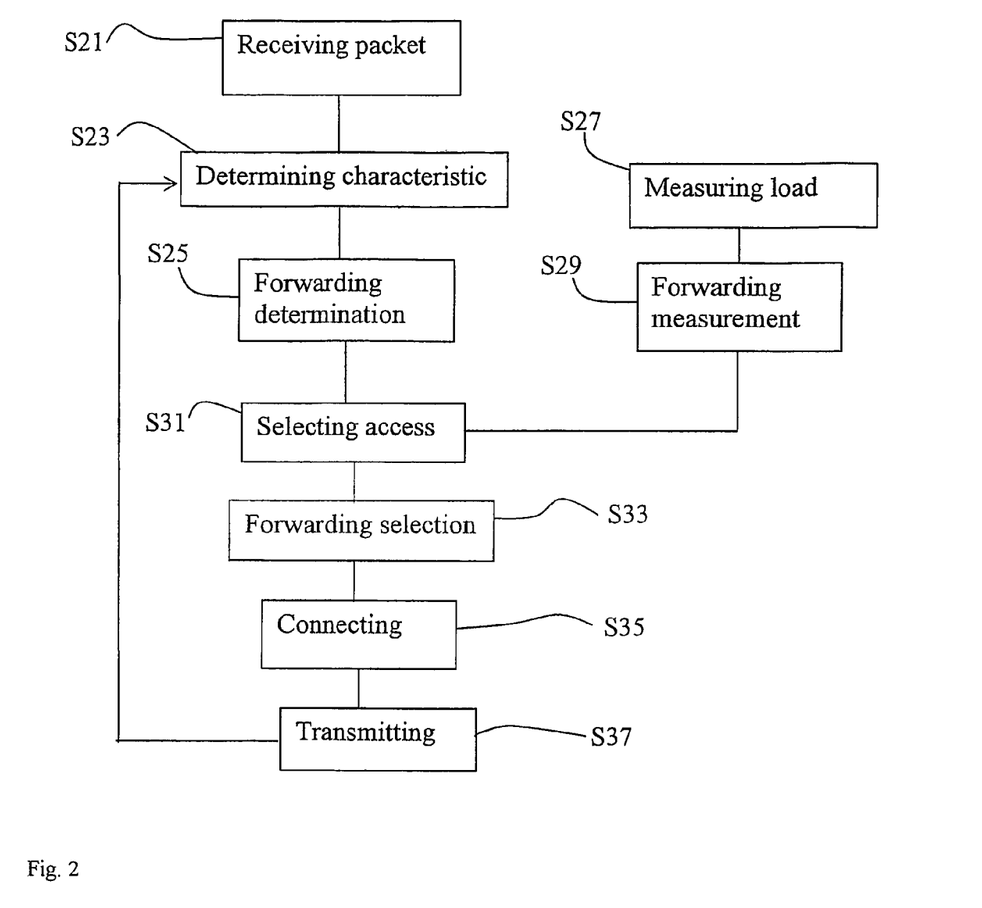
FIG. 2 is a flow chart of a non-limiting example of the inventive method.

In FIG. 2 a flow chart of an example method is shown. The steps of the method are described below:

S21: Receiving in a splitting point 1 packet data that should be transmitted out from the splitting point. In the case where the splitting point is in a user terminal communicating in the multi-access system the data is data the user of the terminal wants to transmit in the system. The data is arranged in packets and the packets are received in a subsequent order in the splitting point.

S23: Determining in the splitting point one or more packet characteristics for the first packet in the packet queue. The packet characteristics could be for example as described above packet size, inter-arrival-time, PER- or BER-requirements.

S25: Forwarding the determined packet characteristic(s) for the first packet to an access selecting means 7 in the splitting point.

S27: Measuring the load in the different access systems in a load measuring means 9. This step could be performed earlier in the flow or it could also be performed continually.

S29: Forwarding said load measure to the access selecting means 7. The load could be reported to the access selecting means 7 whenever there is a change in load or in predefined time intervals or when the load is changed more than a defined amount or passes defined thresholds.

S31: Selecting one of the available accesses, the selection being based on determined packet characteristic or on both load and determined packet characteristic.

S33: Forwarding instructions of which access that has been selected to a switching means.

S35: Connecting the packet queue through the switching means to the selected access system.

S37: Transmitting the first packet in the packet queue, i.e. the packet whose packet characteristic was determined, through the selected access.

The steps are here described as being performed in the splitting point. However it would also be possible to perform the steps in another node in the network and retrieve the result in the splitting point.

Figure 3:
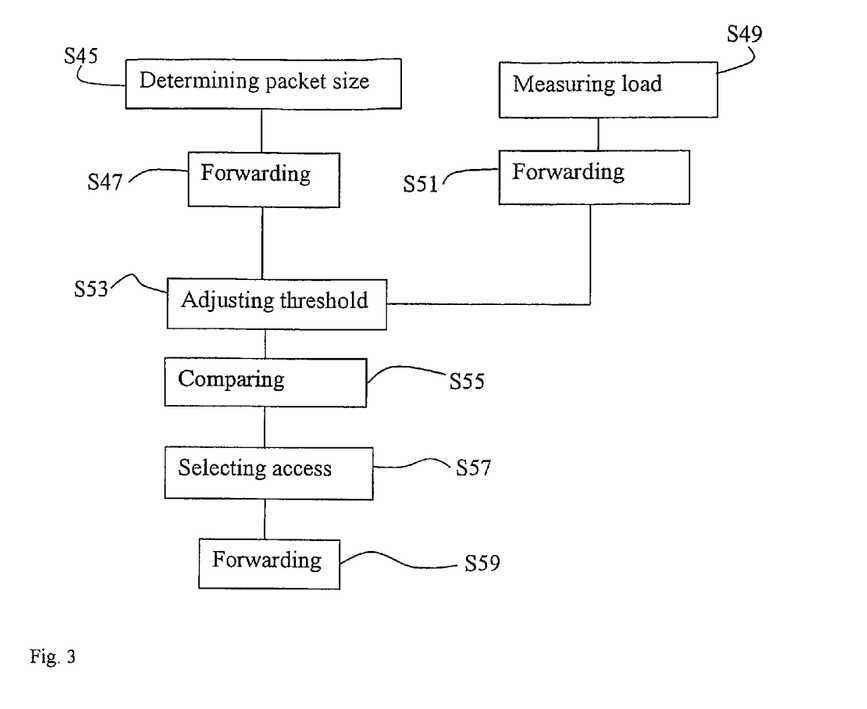
FIG. 3 is a flow chart of one non-limiting embodiment of the invention.

In FIG. 3 a flow chart of non-limiting embodiment is shown. In this example embodiment the packet characteristic that is determined is the packet size and the access selecting means comprises at least one threshold value with which the packet size should be compared. The steps are described below:

S45: Determining the packet size of the first packet in the packet queue in the splitting point by reading it from the header of the packet.

S47: Forwarding the determined packet size to the access selecting Means.

S49: Measuring the load in the different access systems. This step could Be performed anywhere in the network and anywhere in the flow or continually as described above.

S51: Forwarding the measured loads to the access selecting means.

S53: Adjusting the at least one threshold in the access selecting means according to the received load measures. For example if one access system is highly loaded the packet size threshold could be adjusted such that fewer packets will be directed to this access system.

S55: Comparing the determined packet size with the at least one threshold.

S57: Selecting an access depending on the relation between the packet size and the threshold(s). For example if a packet size is determined to be larger than the threshold value for the packet size one access is selected and if the packet size is determined to be smaller another access is selected.

S59: Forwarding instructions about the selection to the switching means and proceed as described above.

More than one threshold could be provided in the access selecting means. Possibly one access is suitable both for very small packets and for very large packets and another access is suitable for the middle sized packets. Furthermore, if there are more than two different access systems more than one threshold is needed.

Another example of packet characteristic that could be determined and used for the selection is packet inter-arrival-time. In this case the packet characteristic determining means is adapted to measure the time between packets arriving to the splitting point. This time could then be used when selecting the most suitable access system. This will be described in more detail when the third embodiment is described below.

Delay requirements for the packets can also be used for the selection of access system. One access can be relatively more efficient for delay sensitive packets than another.

All the described packet characteristics could also be combined when making the selection.

Five more detailed embodiments are described below.

First Embodiment, WCDMA R99 (DCH) and 802.11b

Figure 4:
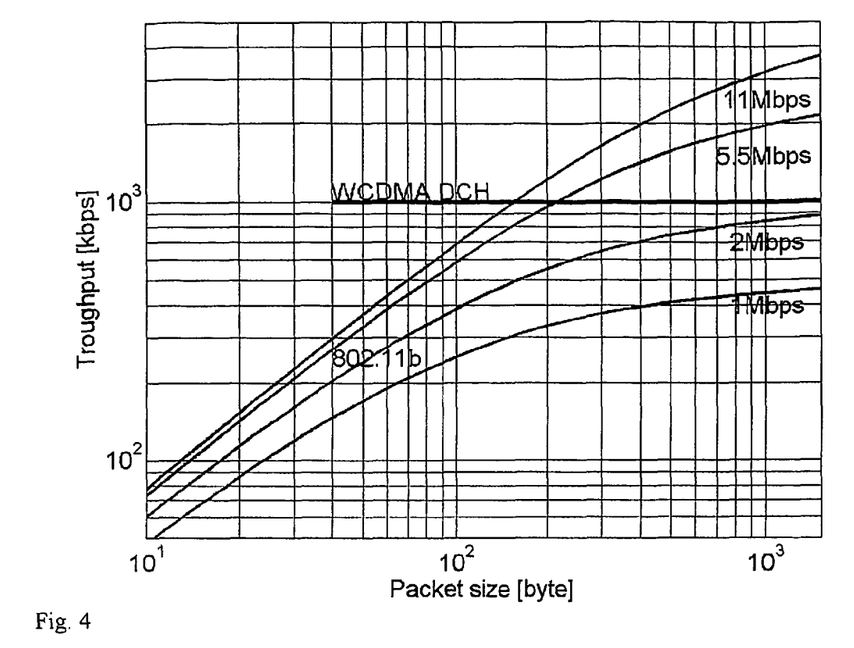
FIG. 4 is a diagram showing throughput in two different accesses in relation to packet size.

In a first embodiment a multi-access system comprising WCDMA (Wideband Code-Division Multiple Access) and WLAN is described. In FIG. 4 throughput as a function of packet size for one 802.11b AP (half duplex) and one WCDMA transceiver with DCH (Dedicated CHannel) channels (fall duplex) is shown.

WCDMA throughput is rather independent of the packet size, at least down to the RLC (Radio Link Control) payload size of 320 bits (40 bytes). WLAN throughput is very dependent on the packet size. The four different transmission rates of WLAN 802.11b are shown separately in the diagram. For the highest WLAN transmission rate (11 Mbps) there is a factor of more than 10 between the throughput for 50 byte packets and 1500 byte packets.

The reason for the packet size dependency in WLAN is the large physical overhead per packet, as described in "On the need for Efficiency in the 802.11 QoS Solution" by M. Sherman. An equally sized overhead is applied on a small 50 byte packet as for a large 1500 byte packet. From this entails that FIG. 4 applies not only for a specific packet size but also for an average packet size. For example; to send one 50 byte packet and one 1500 byte packet two times physical overhead is required, which is the same as for two 775 byte packets.

Assume for example a typical scenario with TCP/IP traffic with 1000 byte forward packets in average and one 50 byte ACK packet for each forward packet. For such loads there is a clear gain in the total multi-access capacity to send the ACK-packets on WCDMA DCH and the forward packets on 802.11b.

Without any packet size access selection the packet sizes are distributed evenly on both accesses, that is half of the packets are 50 byte and half are 1000 byte resulting in an average packet size of 525 byte on both WLAN and WCDMA. This will be the case both with a random access selection per packet as well as with strictly load-based access selection. It will also be the case with service-based access selection if the services have the same packet size distributions. The latter allocates the whole service including forward packets and ACK packets to the same access. For an average packet size of 525 byte the 11 Mbps throughput is 2.3 Mbps and the WCDMA throughput is 2×1 Mbps (full duplex) (WCDMA full duplex has two separate channels, one for up- and one for downlink, each with 1 Mbps) resulting in a total throughput of 4.3 Mbps or 2.15 Mbps in each direction (with one 802.11b AP and one WCDMA transceiver).

With packet size access selection all the 50 byte packets are switched to WCDMA leaving only 1000 byte packets in WLAN. This will result in that the WLAN throughput will be increased to 3.2 Mbps and the total multi-access throughput to 5.2 Mbps which is a 21% or a 0.9 Mbps increase. The 50 byte packets represent only 1/20 (50/1000) of the total load, that is 260 kbps. The remaining 1740 kbps (2 Mbps-260 kbps) capacity in WCDMA, is utilized by allocating some 1000 byte packets to WCDMA in addition to the 50 byte packets. In this simple scenario with only two packet sizes this means that the threshold will be below 1000 byte until WLAN is fully loaded with 1000 byte packets and then increased to above 1000 byte until WCDMA is fully loaded with 50 byte and 1000 byte packets and then, when there is some free capacity again in WLAN the threshold is decreased again. For a scenario with more continuous packet size distribution a more constant threshold can be found.

For an uneven uplink/downlink load situation the gain can be even larger. The downlink throughput is 1 Mbps for a WCDMA transceiver and 2.2 Mbps (2.3*19/20) for a WLAN AP. Assuming only ACK packets uplink there is only 50 kbps load on WCDMA uplink. Allocating the WLAN ACK packets to WCDMA then utilizes this spare capacity. The total downlink throughput is then increased from 3.2 Mbps to 4.2 Mbps which is 31%.

Second Embodiment, WCDMA R5 (HS-DSCH) and 802.11a/g

Figure 5:
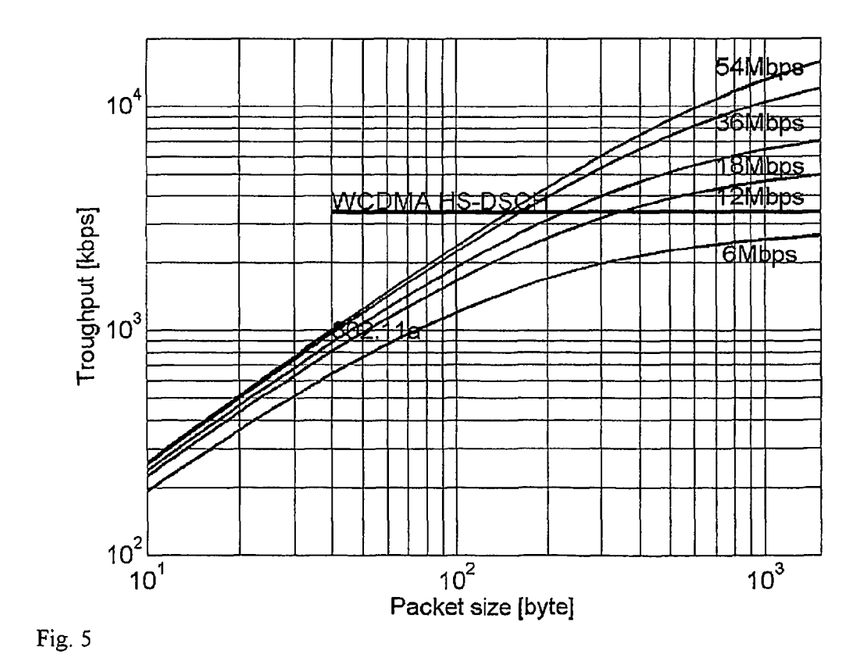
FIG. 5 is a diagram showing throughput in two other accesses in relation to packet size.

In FIG. 5 the packet size impact on performance is shown for 802.11a/g and HS-DSCH (High Speed-Downlink Shared CHannel).

The same type of characteristics as for 802.11b and DCH can be seen and the same access selection applies.

In a downlink limited scenario with 54 Mbps modulation on 802.11a the gain on downlink throughput by moving the 50 byte ACK-packets to HS-DSCH is 38% or 4.5 Mbps with one AP and one WCDMA transceiver (3.4 Mbps on US-DSCH and an increase from 8.5 to 13 Mbps on WLAN).

Third Embodiment, GPRS and 802.11b

When packets are to be sent over GPRS a TBF (Temporary Block Flow) is established. This requires signaling over the radio channel that takes time and costs radio resources. A TBF establishment will result in an additional delay of around 400 ms for downlink and 150 ms for uplink depending on standards. This additional delay will be relatively worse for small packets since larger packets have longer transmission delay. The same applies on signaling costs; the transmission of a large packet costs more and the increase in cost for the TBF establishment is relatively less than for a small packet. When a TBF is established it is kept until a predefined time period has elapsed after the last received packet. This TBF release time is a parameter that is typically set to 1-5 seconds. After this time period a new TBF has to be established when new packets should be transmitted.

WLAN does not have any similar channel establishment. The packet delay is independent of the time since last sent packet.

With a packet inter-arrival access selection the number of TBF establishments can be reduced improving both user quality (delay) and capacity (reduced signaling). If a packet is arrived to the splitting point less than the TBF release time since the last packet was sent on the GPRS access it is also sent on the GPRS access. If the packet inter-arrival-time is longer the selection is based on load. GPRS is still selected if WLAN is highly loaded.

This packet inter-arrival-time selection can preferable be combined with the packet-size selection. If the packet inter-arrival-time is longer than the TBF release time GPRS still can be selected if the packet is large. That is when the TBF establishment delay and signaling is relatively small compared to the packet transmission time and cost.

Also delay requirement per packet can be taken into account. Even if packet-inter-arrival time has exceeded the TBF release time GPRS can be selected if the delay requirements can be fulfilled and GPRS is less loaded.

Fourth Embodiment, WCDMA DCH and 802.11b Case 2

WCDMA DCH has as GPRS additional delay depending on packet inter-arrival-time. That depends on the channel switching mechanism. The packet channel data rate is increased (switched up to a higher data rate, lower spreading code) when more data is transmitted and decreased when less data has been transmitted. This channel switching mechanism has timers and filters to trigger up- and down-switch.

The access selection function between WCDMA DCH and WLAN can be similar to the combined selection described above for GPRS-WLAN. A filter can be applied that aims to follow the channel switching. WCDMA is then selected during longer periods with a more constant load while WLAN is selected for shorter bursts of data.

Fifth Embodiment, Live Video Streaming Over EGPRS and 802.11b

A video stream consists of I(ntra)-frames and P(rediction)-frames. P-frames use the preceding image for prediction of the current picture. The P-frames are then more sensitive for packet errors since following P-frames rely on it while I-frames are independent.

Both 802.11b and EGPRS (Enhanced GPRS) can deliver very low PER with acknowledged mode by retransmitting faulty packets. However EGPRS acknowledge mode entails long delay, which is not desired for live video streaming. The retransmission on WLAN is fast and does not increase the delay significantly. By transmitting the I-packets on EGPRS and the P-packets on WLAN a higher common capacity can be achieved than allocating whole video-streams to EGPRS and WLAN.

The example method is implemented by means of a computer program product comprising the software code means for performing the steps of the method. The computer program product is run in a splitting point terminal as defined above positioned in the multi access system. It could also as described above be run in another node in the system, whereby said node forwards information about the access selection to the splitting points. The computer program is loaded directly or from a computer usable medium, such as a floppy disc, a CD, the Internet etc.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for selecting radio access system in a multi access system handling packet data services where a terminal communicates with at least two different types of radio access systems, the method being performed by a splitting point for each packet to be transmitted, the method comprising:
   determining a packet size of the packet;
   measuring loads in the at least two different types of radio access systems;
   selecting one of the available radio access systems for transmission of the packet based on the packet size of the packet and the loads in the available radio access systems; and
   transmitting the packet through the selected radio access system.

2. The method according to claim 1, further comprising providing simultaneous association over more than one radio access system in the multi access system by establishing connections prepared for packet transmission.

3. The method according to claim 1, further comprising:
comparing the packet size with at least one packet size threshold which is defined in the multi access system as a border value where a larger packet size suitably is transferred in one radio access system and a smaller packet size suitably is transferred in another radio access system for achieving best transferring efficiency; and
selecting one of the available radio access systems for the transmission of the packet according to a relation between the packet size and the at least one packet size threshold.

4. The method according to claim 3, further comprising adjusting the at least one packet size threshold depending on the loads in the available radio access systems.

5. The method according to claim 1, further comprising; determining a packet inter-arrival-time and selecting one of the available radio access systems for the transmission of the packet further based on the packet size and the packet inter-arrival-time of packets to be transmitted.

6. The method according to claim 1, further comprising:
determining one or more of a Packet Error Rate (PER) requirement, a Bit Error Rate (BER) requirement, and a delay requirement for each packet; and
selecting one of the available radio access systems for the transmission of the packet further based on the packet size and any one or more of the PER-, BER- and delay requirements of the packet.

7. The method according to claim 1, wherein the splitting point is a wireless terminal.

8. A multi access system configured to handle packet data services where a terminal communicates with at least two different types of radio access systems, the multi access system comprising:
packet characteristic determining means configured to determine, for each packet to be transmitted, a packet size of the packet; and
load measuring means configured to measure loads in the available radio access systems; and
access selecting means connected to the packet characteristic determining means and configured to select one of the available radio access systems for transmission of the packet, the selection being based on the packet size of the packet and the loads in the available radio access systems.

9. The multi access system according to claim 8, wherein the multi access system is configured to provide simultaneous Informal: association over more than one radio access systems by establishing connections prepared for packet transmission.

10. The multi access system according to claim 8, wherein the access selecting means comprises comparing means configured to compare the packet size with at least one packet size threshold which is defined in the multi access system as a border value where a larger packet size suitably is transferred in one access system and a smaller packet size suitably is transferred in another access system for achieving best transferring efficiency, and the access selecting means is configured to select one of the available radio access systems for the transmission of the packet according to a relation between the packet size and the at least one packet size threshold.

11. The multi access system according to claim 10, wherein the access selecting means is configured to adjust the at least one packet size threshold depending on the loads in the available radio access systems.

12. The multi access system according to claim 10, wherein the access selecting means is configured to receive the at least one packet size threshold and adjustments of the at least one packet size threshold depending on the measured loads in the available radio access systems from a node in the multi access system.

13. The multi access system according to claim 8, wherein the packet characteristic determining means is configured to determine a packet inter-arrival-time, and the access selecting means is configured to select one of the available radio access systems for the transmission of the packet further based on the packet size and the packet inter-arrival-time of packets to be transmitted.

14. The multi access system according to claim 8, wherein the packet characteristic determining means is configured to determine one or more of a Packet Error Rate (PER) requirement, a Bit Error Rate (BER) requirement, and a delay requirement for each packet, and the access selecting means is configured to select one of the available access systems further based on the packet size and one or more of the PER-, BER- and delay requirements of the packet.

15. The multi access system according to claim 8, wherein the multi access system comprises splitting points that are common to the available radio access systems and which are configured to select one of the available radio access systems for outgoing traffic, said splitting points comprising the packet characteristic determining means and the access selecting means.

16. A wireless terminal which communicates with at least two different types of radio access systems handling packet data services, the terminal comprising:
packet characteristic determining means configured to determine, for each packet to be transmitted, a packet size of the packet; and
load measuring means configured to measure or retrieve measures of loads in the available radio access systems; and
access selecting means connected to the packet characteristic determining means and configured to select one of the available radio access systems for transmission of the packet, the selection being based on the packet size of the packet and the loads in the available radio access systems.

17. The wireless terminal according to claim 16, wherein the wireless terminal is configured to support simultaneous association over more than one radio access systems by establishing connections prepared for packet transmission.

18. The wireless terminal according to claim 16, wherein the access selecting means comprises comparing means configured to compare the packet size with at least one packet size threshold which is defined in the multi access system as a border value where a larger packet size suitably is transferred in one access system and a smaller packet size suitably is transferred in another access system for achieving best transferring efficiency, and the access selecting means is configured to select one of the available radio access systems for the transmission of the packet according to a relation between the packet size and the at least one packet size threshold.

19. The wireless terminal according to claim 18, wherein the access selecting means is configured to adjust the at least one packet size threshold depending on the loads in the available radio access systems.

20. The wireless terminal according to claim 18, wherein the access selecting means is configured to receive the at least one packet size threshold and adjustments of the at least one packet size threshold depending on the measured loads in the available radio access systems from a node in the multi access system.

21. The wireless terminal according to claim 16, wherein the packet characteristic determining means is configured to determine a packet inter-arrival-time, and the access selecting means is configured to select one of the available radio access systems further based on the packet size and the packet inter-arrival-time of packets to be transmitted.

22. The wireless terminal according to claim 16, wherein the packet characteristic determining means is configured to determine one or more of a Packet Error Rate (PER) requirement, a Bit Error Rate (BER) requirement, and a delay requirement for each packet, and Informal: For discussion only the access selecting means is configured to select one of the available access systems further based on the packet size and one or more of the PER-, BER- and delay requirements of the packet.

23. A computer program product directly loadable into the internal memory of a processing means within a splitting point node or a user terminal communicating in a multi access system or within another node in the system forwarding information about an access selection to the splitting point or user terminal, comprising the software code means for performing the method steps of claim 1.

24. A non-transitory computer usable medium storing therein a computer readable program for causing a processing means within a splitting point node or a user terminal communicating in a multi access system or within another node in the system forwarding information about a radio access selection to the splitting point or user terminal, to control an execution of the method steps of claim 1.

* * * * *

UNITED STATES PATENT AND TRADEMARK OFFICE
CERTIFICATE OF CORRECTION

PATENT NO. : 7,983,241 B2
APPLICATION NO. : 10/579844
DATED : July 19, 2011
INVENTOR(S) : Furuskar et al.

It is certified that error appears in the above-identified patent and that said Letters Patent is hereby corrected as shown below:

In Column 5, Line 24, delete "non-limiting" and insert -- a non-limiting --, therefor.

In Column 5, Line 34, delete "Means." and insert -- means. --, therefor.

In Column 5, Line 36, delete "Be" and insert -- be --, therefor.

In Column 6, Line 16, delete "(fall" and insert -- (full --, therefor.

In Column 7, Line 27, delete "US-" and insert -- HS- --, therefor.

In Column 9, Line 18, in Claim 5, delete "comprising;" and insert -- comprising: --, therefor.

In Column 11, Line 13, in Claim 22, delete "For" and insert -- for --, therefor.

Signed and Sealed this
Thirteenth Day of March, 2012

David J. Kappos
*Director of the United States Patent and Trademark Office*